Sept. 26, 1967 M. L. FAIRAIZL ETAL 3,343,344
SUCTION CLEANER AND FILTER CONSTRUCTION
Filed Dec. 14, 1965 2 Sheets-Sheet 1

INVENTORS.
Max L. Fairaizl and
Eugene F. Martinec
Freese, Bishop & Schick
ATTORNEYS Sept. 26, 1967  M. L. FAIRAIZL ETAL  3,343,344
SUCTION CLEANER AND FILTER CONSTRUCTION
Filed Dec. 14, 1965  2 Sheets-Sheet 2

INVENTORS
Max L. Fairaizl and
Eugene F. Martinec

Frease, Bishop & Schick
ATTORNEYS

# United States Patent Office 3,343,344
Patented Sept. 26, 1967

3,343,344
SUCTION CLEANER AND FILTER CONSTRUCTION
Max L. Fairaizl, Chagrin Falls, and Eugene F. Martinec, East Cleveland, Ohio, assignors to Health-Mor, Inc., Chicago, Ill., a corporation of Illinois
Filed Dec. 14, 1965, Ser. No. 513,800
7 Claims. (Cl. 55—376)

ABSTRACT OF THE DISCLOSURE

Filter construction for an upright tank or canister-type vacuum cleaner having a foraminous (preferably frusto-conical) filter support therein. An air pervious (preferably conical) filter of paper or the like having an air impervious dust collector bag of polyethylene or similar material bonded at its upper edge to the filter at a zone spaced from the upper edge thereof, the bag having an inlet opening in one side. The support having openings registering with a zone of the filter between the upper edge of the bag and the upper edge of the filter for equalizing air presure in the tank or canister between the inside and the outside of the bag.

---

The invention relates to filter construction for vacuum cleaners, and more particularly to a combination filter and dust-collecting bag for vertical tank or canister-type vacuum cleaners.

Vacuum cleaners of the general type to which the invention pertains comprise an open-top, pan-like preferably cylindrical receptacle having an inlet for a suction hose, and a conical paper filter supported within the container upon a foraminous conical support.

A motor-driven fan is located above or within the conical filter support, drawing dust-laden air through the suction hose and depositing the dust outside the conical filter and in the receptacle, from which it must be emptied from time to time, this being a disagreeable job for the housewife.

Attempts have been made to provide an air impervious dust bag around the filter within the receptacle, but such devices have not been practical because the differential in air pressure on the inside and outside of the bag normally collapses the impervious bag against the filter preventing proper operation.

Thus, the differential in air pressure on opposite sides of the bag provides a continuous tendency for the bag to pull away from the walls of the receptacle and to be drawn against the surface of the conical filter, thus collapsing the bag so that little or no dust can be collected therein.

It is, therefore, a primary object of the pressure invention to provide a combined filter and dust-collecting bag construction for such a vacuum cleaner, with means for equalizing air pressure on the inside and outside of the bag to prevent collapse of the bag.

Another object of the invention is to provide such a device in which the mouth of the bag is attached to the conical paper filter at a point spaced from the edge thereof.

A further object of the invention is to provide a vacuum cleaner of the character described, in which the foraminous frusto-conical support is provided with openings above the zone where the mouth of the bag is attached to the paper filter, so that air may be sucked therethrough from between the exterior of the bag and the interior of the container to provide equalized pressure on both sides of the bag.

These and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicants have contemplated applying the principle, being set forth in detail in the following description and illustrated in the accompanying drawings.

In general terms the invention may be briefly described as comprising a canister-type vacuum cleaner having an upright cylindrical receptacle with inlet connector means in one side for attachment of a suction hose with a nozzle or tool thereon.

A foraminous frusto-conical support is suspended from the upper end of the receptacle, and a motor-driven suction fan is located within the foraminous support. A combined conical filter, of porous paper or the like, and an air impervious bag, of polyethylene or the like, are located within the container.

The conical paper filter is supported upon the foraminous conical support and has tabs at its edge clamped between a soft rubber ring gasket at the upper edge of the receptacle and a rubber gasket on the combined fan and motor housing.

The edge of the polyethylene bag is bonded or cemented to the conical paper filter at a zone spaced from the upper edge of the filter, and has an inlet opening adapted to engage the inlet connector means in the receptacle, the bag forming a lining within the receptacle.

The foraminous frusto-conical support is provided with apertures located above the zone where the bag is bonded to the filter when the conical paper filter is positioned upon said support, so as to equalize the air pressure on the inside and outside of the polyethylene bag, whereby the bag will act as a liner for the receptacle, remaining in substantial contact with the bottom and side walls thereof.

Having now briefly described the invention and the objects thereof, reference is now made to the accompanying drawings, in which.

Similar numerals refer to similar parts throughout the drawings.

Figure 1:
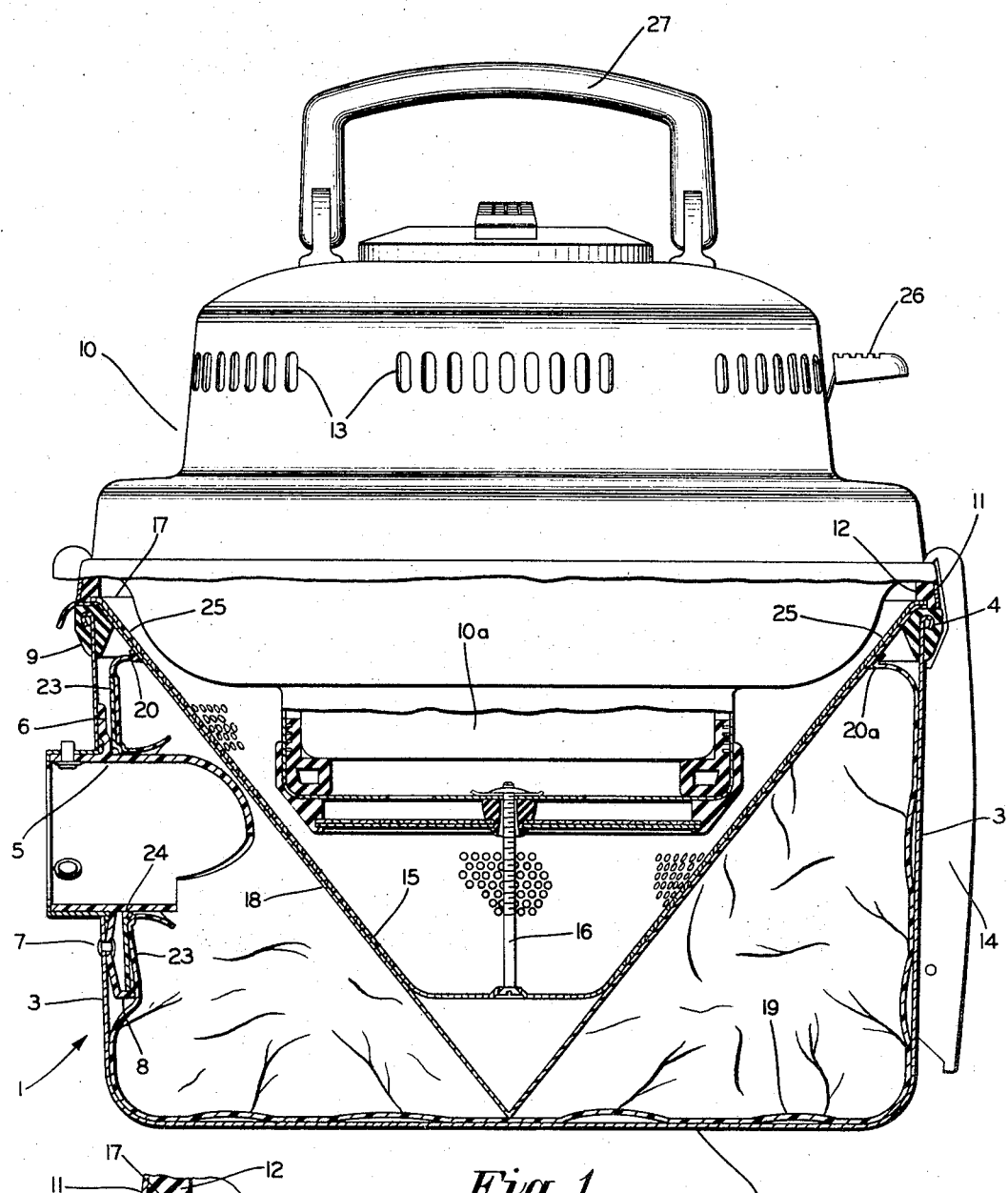
FIG. 1 is a vertical sectional view through a canister-type suction cleaner having a filter construction embodying the invention.

Referring now more particularly to the embodiment illustrated in the drawings, the suction cleaning apparatus illustrated comprises a vertical tank or canister-type suction cleaner and includes a pan-like dust receptacle or collector indicated generally at 1, formed by the bottom wall 2 and annular side wall 3 which terminates in an upper, preferably beaded edge 4 so that the dust receptacle 1 is upwardly open.

The cylindrical side wall 3 of the dust receptacle 1 is provided with an inlet opening connector 5 with which a flexible hose (not shown) may be connected in usual manner. As in usual practice, the hose may be provided with a suitable nozzle or other tool for cleaning any desired surface or article.

The tubular inlet connector 5 is preferably formed of a plastic material and is provided midway of its length with an annular flange 6 connected to the adjacent portion of the annular wall 3 as by rivets 7. An upwardly open channel 8 is formed upon an extension of the lower portion of the flange 6, for a purpose to be later described.

Figure 2:
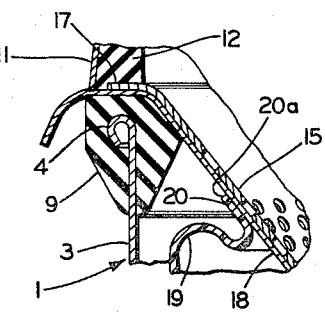
FIG. 2 is an enlarged fragmentary vertical sectional view through one side of the mating edges of the receptacle and the fan and motor housing, showing adjacent portions of the foraminous conical support and the conical paper filter and polyethylene bag.

An annular, preferably soft rubber gasket ring 9, having a generally U-shaped cross section as shown in FIGS. 1 and 2, is engaged over and around the upper beaded edge 4 of the receptacle side wall 3.

Cover means, indicated generally at 10, also functions as a motor-driven fan housing, as shown in prior Martinec patents such as Nos. 2,627,936 and 2,627,937, issued Feb. 10, 1953. As disclosed in said Martinec patents, a motor-fan unit 10a is mounted within said housing.

A depending annular flange 11, upon the cover 10, contains the soft rubber gasket ring 12. The upper portion of the cover member 10 is perforated, as indicated at 13 in FIG. 1, for the passage of exhaust air from the cleaner in normal operation when the cover is in place. Conventional clamping means 14 may be provided for clamping the cover 10 upon the receptacle 1 in conventional manner.

As in usual practice in suction cleaners of this general type, a foraminous frusto-conical support 15 is connected to the motor fan unit within the housing 10 as by a screw 16. The outwardly flared upper edge 17 of the foraminous support 15 is received between the rubber ring 9 and the rubber ring 12.

It is common practice in suction cleaners of this general type to support a conical filter of paper or the like upon the foraminous conical support 15 so that in operation of the cleaner, as dust-laden air is drawn through the inlet connector 5, the dust is deposited in the receptacle 1, while the air is drawn through the filter by the motor-fan unit and discharged through the apertures 13 in the housing 10.

The receptacle 1 must be emptied periodically in order to dispose of the collected dust, this being a messy process which is distasteful to housewives. The present invention involves the provision of a combination filter, of paper or the like, and an impervious dust-collector bag, of polyethylene or the like, attached thereto, with means for equalizing the air pressure upon the inside and outside of the bag so that the same will form a liner for the bottom and annular side wall of the receptacle.

Figure 4:
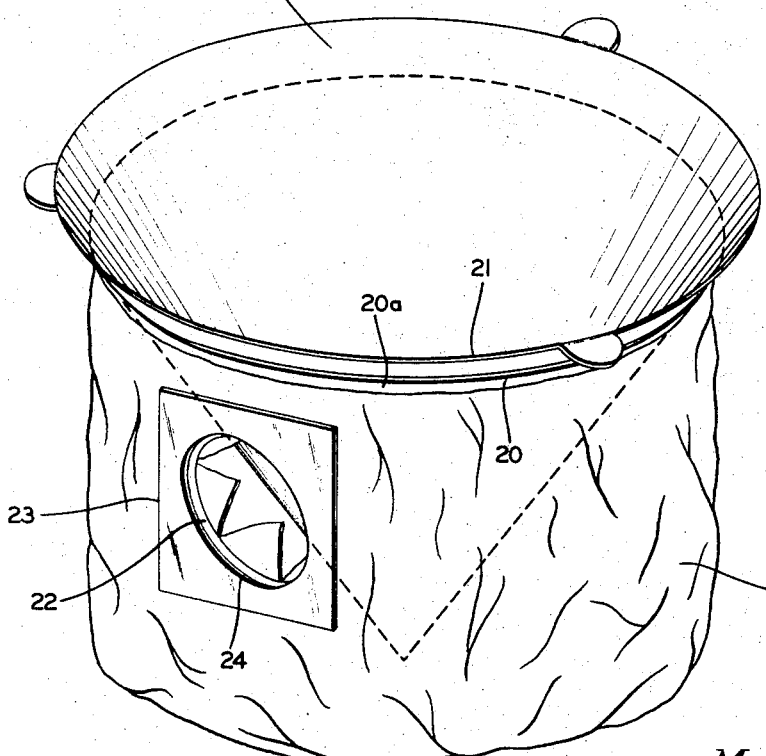
FIG. 4 is a detached perspective view of the combined paper filter and polyethylene bag.

For this purpose, a conical filter 18, of paper or the like, has an air impervious bag 19, of polyethylene or the like, attached thereto. As shown in FIGS. 1 and 4, the upper edge 20 of the bag 19 is cemented or otherwise bonded at 20a to the exterior of the conical filter 18 at a zone spaced below the upper edge 21 of the filter.

An inlet opening 22 is formed in one side of the bag 19 and a small rectangular sheet 23 of semi-rigid plastic material or the like is attached thereto and provided with an inlet opening 24, adapted to fit snugly around the inlet connector 5, the lower edge of member 23 being received in the channel 8, as shown in FIG. 1.

Figure 3:
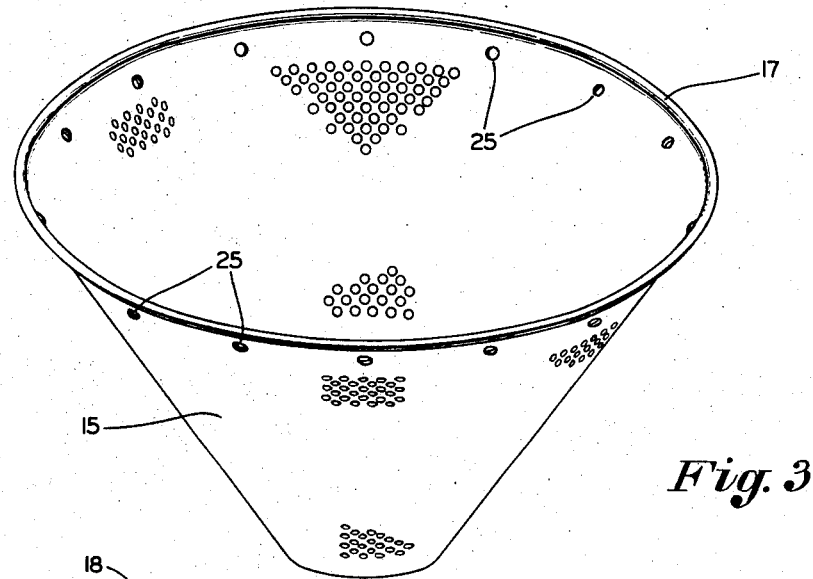
FIG. 3 is a detached perspective view of the foraminous conical support.

As best shown in FIGS. 1, 2 and 3, apertures 25 are formed in the foraminous frusto-conical support 15 at a location above the bond 20a of upper edge 20 of bag 19 when the combined filter and bag are assembled upon the support 15. This equalizes the air pressure on the inside and outside of the bag 19 and permits the bag to adhere to the bottom wall 2 and annular side wall 3 of the container 1 in the manner of a liner.

A switch 26 is provided for controlling the motor-fan unit and a handle 27 is provided upon the top of the housing 10 for manipulating the cleaner.

It was found that without provisions for equalizing the air pressure on both sides of the bag, the arrangement was inoperative because the suction of the air entering the bag through the inlet 5 and being drawn through the filter 18 pulled the bag away from the bottom and side walls of the receptacle 1 and drew it against the filter 18 so as to cut off effective cleaning suction.

By providing the means for equalizing air pressure on the inside and outside of the bag, it has been found that the bag will remain in contact with the bottom and side walls of the container throughout operation of the suction cleaner so as to receive dust and dirt filtered from dust-laden air drawn into the cleaner.

When the bag 19 is substantially filled with dust, the cover 10 may be removed and the combined filter and bag discarded and replaced with a new filter and bag without contact with the accumulation of dirt in the bag by the operator's hands.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. In suction cleaner filter construction comprising an upright receptacle having an inlet connector in one side, a motor-fan unit mounted upon the upper edge of the receptacle, a foraminous filter support within said receptacle between the motor-fan unit and the inlet connector, a combination air filter and air impervious dust collector bag within the receptacle, the filter of said combination having an upper edge portion supported upon the foraminous filter support, the upper edge of the bag of said combination being attached to the filter at a zone spaced from the upper edge of the filter, there being an inlet opening in the bag fitting upon said inlet connector, and means on said filter support between the upper edge of the bag and the upper edge of the filter for equalizing air pressure on the inside and outside of the bag.

2. In suction cleaner filter construction as defined in claim 1, the foraminous filter support being frusto-conical and the filter being conical.

3. In suction cleaner filter construction as defined in claim 1, the means for equalizing air pressure on the inside and outside of the bag comprising apertures in a zone in said foraminous support registering with a zone in the filter located between the zone where the bag is attached to the filter and the upper edge of the filter.

4. In suction cleaner filter construction as defined in claim 3, the foraminous filter support being frusto-conical and the filter being conical.

5. In suction cleaner filter construction as defined in claim 1, there being a sheet of semi-rigid material attached to the bag at the inlet opening therein, said sheet of semi-rigid material having an opening therein communicating with the inlet opening in the bag and fitting upon said inlet connector, and an upwardly open channel in the receptacle below the inlet connector, the lower edge of said semi-rigid sheet of material being seated in said channel.

6. In suction cleaner filter construction as defined in claim 5, the foraminous filter support being frusto-conical and the filter being conical.

7. In suction cleaner filter construction as defined in claim 5, the means for equalizing air pressure on the inside and outside of the bag comprising apertures in a zone in said foraminous support registering with a zone in the filter located between the zone where the bag is attached to the filter and the upper edge of the filter.

References Cited

UNITED STATES PATENTS

| | | | |
|---|---|---|---|
| 1,504,136 | 8/1924 | Patterson et al. | 55—364 |
| 2,591,382 | 4/1952 | Smith | 55—373 |
| 2,627,936 | 2/1953 | Martinet | 55—471 |
| 2,627,937 | 2/1953 | Martinet | 55—372 |
| 2,630,879 | 3/1953 | Hage | 55—429 |
| 2,639,001 | 5/1953 | Meyerhoefer | 55—368 |
| 2,656,897 | 10/1953 | Yonkers | 55—373 |
| 3,204,391 | 9/1965 | Schwab | 229—53 |

FOREIGN PATENTS

| | | |
|---|---|---|
| 1,345,574 | 11/1963 | France. |
| 1,387,792 | 12/1964 | France. |

HARRY B. THORNTON, *Primary Examiner.*

FRANK W. LUTTER, *Examiner.*

B. NOZICK, *Assistant Examiner.*